US007614083B2

(12) United States Patent
Khuti et al.

(10) Patent No.: US 7,614,083 B2
(45) Date of Patent: Nov. 3, 2009

(54) PROCESS CONTROL METHODS AND APPARATUS FOR INTRUSION DETECTION, PROTECTION AND NETWORK HARDENING

(75) Inventors: Bharat Khuti, Raleigh, NC (US); Clayton Coleman, Attleboro, MA (US); David Rath, Latrobe, PA (US); Ernest Rakaczky, Pincourt (CA); Jim Leslie, Calgary (CA); Juan Peralta, Lambert (CA); George Simpson, Simpsonville, SC (US)

(73) Assignee: Invensys Systems, Inc., Foxboro, MA (US)

( * ) Notice: Subject to any disclaimer, the term of this patent is extended or adjusted under 35 U.S.C. 154(b) by 925 days.

(21) Appl. No.: 11/078,082

(22) Filed: Mar. 11, 2005
(Under 37 CFR 1.47)

(65) Prior Publication Data
US 2006/0053491 A1    Mar. 9, 2006

Related U.S. Application Data

(63) Continuation of application No. 11/069,465, filed on Mar. 1, 2005.

(60) Provisional application No. 60/549,342, filed on Mar. 1, 2004, provisional application No. 60/588,622, filed on Jul. 16, 2004.

(51) Int. Cl.
*G06F 11/00* (2006.01)

(52) U.S. Cl. ............................................. 726/22; 726/23

(58) Field of Classification Search .................. 726/2–4, 726/22–25, 11–16; 713/176, 188; 709/224–225
See application file for complete search history.

(56) References Cited

U.S. PATENT DOCUMENTS 6,279,113 B1 * 8/2001 Vaidya ........................ 726/23
6,298,445 B1 * 10/2001 Shostack et al. .............. 726/25

(Continued)

FOREIGN PATENT DOCUMENTS

EP        0411869        2/1991

(Continued)

OTHER PUBLICATIONS

Office Action, U.S. Appl. No. 11/069,465, dated Sep. 19, 2008.

*Primary Examiner*—Hosuk Song
(74) *Attorney, Agent, or Firm*—Nutter McClennen & Fish LLP; David J. Powsner; Joshua T. Matt

(57) ABSTRACT

The invention provides an improved network and methods of operation thereof for use in or with process control systems, computer-based manufacturing or production control systems, environmental control systems, industrial control system, and the like (collectively, "control systems"). Those networks utilize a unique combination of firewalls, intrusion detection systems, intrusion protection devices and/or other devices for hardening (e.g., security against hacking, intrusion or other mischievous conduct) and/or intrusion detection. The networks and methods have application, by way of example, in plants, sites and other facilities in which networks that support control systems interface with corporate, business or other networks.

25 Claims, 6 Drawing Sheets

U.S. PATENT DOCUMENTS

| | | |
|---|---|---|
| 6,321,334 B1 * | 11/2001 | Jerger et al. .................... 726/1 |
| 7,289,994 B2 * | 10/2007 | Nixon et al. ................... 707/10 |
| 2001/0007133 A1 | 7/2001 | Moriconi et al. |
| 2001/0025307 A1 | 9/2001 | Venkatraman et al. |
| 2001/0034777 A1 | 10/2001 | Venkatraman et al. |
| 2001/0034778 A1 | 10/2001 | Venkatraman et al. |
| 2001/0034779 A1 | 10/2001 | Venkatraman et al. |
| 2001/0034780 A1 | 10/2001 | Venkatraman et al. |
| 2001/0034781 A1 | 10/2001 | Venkatraman et al. |
| 2001/0037489 A1 | 11/2001 | Stripf et al. |
| 2001/0044836 A1 | 11/2001 | Venkatraman et al. |
| 2002/0046254 A1 | 4/2002 | Khan et al. |
| 2002/0052928 A1 | 5/2002 | Stern et al. |
| 2002/0067370 A1 | 6/2002 | Forney et al. |
| 2002/0133636 A1 | 9/2002 | Venkatraman et al. |
| 2002/0150156 A1 | 10/2002 | Calvin |
| 2003/0051068 A1 | 3/2003 | Eldridge et al. |
| 2003/0167269 A1 | 9/2003 | Gupta |
| 2003/0177390 A1 * | 9/2003 | Radhakrishnan ............ 713/201 |
| 2003/0208558 A1 | 11/2003 | Venkatraman et al. |
| 2004/0103165 A1 | 5/2004 | Nixon et al. |
| 2004/0199648 A1 * | 10/2004 | Shelest et al. ................ 709/229 |
| 2004/0230643 A1 | 11/2004 | Thibault et al. |
| 2006/0053491 A1 | 3/2006 | Khuti et al. |
| 2006/0129724 A1 | 6/2006 | Kostadinov |
| 2006/0206860 A1 | 9/2006 | Dardinski et al. |
| 2006/0212146 A1 | 9/2006 | Johnson et al. |
| 2006/0294579 A1 | 12/2006 | Khuti et al. |
| 2007/0019560 A1 | 1/2007 | Brewer et al. |
| 2007/0055689 A1 | 3/2007 | Rhoads et al. |
| 2007/0146231 A1 | 6/2007 | Hamahashi et al. |
| 2007/0233664 A1 | 10/2007 | Hardin et al. |
| 2008/0040477 A1 | 2/2008 | Johnson et al. |
| 2008/0046598 A1 | 2/2008 | Johnson et al. |
| 2008/0052386 A1 | 2/2008 | Johnson et al. |
| 2008/0052632 A1 | 2/2008 | Thibault et al. |
| 2008/0119951 A1 | 5/2008 | Thibault et al. |
| 2008/0120367 A1 | 5/2008 | Thibault et al. |
| 2008/0126500 A1 | 5/2008 | Thibault et al. |
| 2008/0133700 A1 | 6/2008 | Thibault et al. |
| 2008/0134215 A1 | 6/2008 | Thibault et al. |
| 2008/0148170 A1 | 6/2008 | Thibault et al. |

FOREIGN PATENT DOCUMENTS

| | | |
|---|---|---|
| EP | 0592921 | 4/1994 |
| EP | 0640905 | 3/1995 |
| EP | 0660231 | 6/1995 |
| WO | WO-9114324 | 9/1991 |
| WO | WO-9623377 | 8/1996 |
| WO | WO-9631047 | 10/1996 |
| WO | WO-9707486 | 2/1997 |
| WO | WO-9726587 | 7/1997 |
| WO | WO-9820649 | 5/1998 |
| WO | WO-9829804 | 7/1998 |
| WO | WO-9836518 | 8/1998 |

* cited by examiner

PROCESS CONTROL METHODS AND APPARATUS FOR INTRUSION DETECTION, PROTECTION AND NETWORK HARDENING

This is a continuation of U.S. patent application Ser. No. 11/069,465, filed Mar. 1, 2005, which itself claims the benefit of priority of priority of U.S. Provisional Patent Applications Ser. Nos. 60/549,342, filed Mar. 1, 2004, and Ser. No. 60/588,622, filed Jul. 16, 2004, both entitled "Process Control Methods and Apparatus For Intrusion Protection and Network Hardening," the teachings of all three of which applications are incorporated herein by reference in their entirety.

BACKGROUND OF THE INVENTION

The invention pertains to digital data processing and, more particularly, to process control methods and apparatus for intrusion protection and network hardening.

Today's production and other control environments (including environmental control, industrial control, and the like) rely heavily on computer-based control systems. Historically, the communications networks (the "process control networks" or "control networks") as they are sometimes called) over which the components of those control systems communicated was separate from the other business networks, e.g., the corporate LAN.

Increasingly, however, this is not the case. Current technology advances with open systems and the demand for information is driving tighter connectivity between these networks. Devices in use on the process control network have the ability to gather real time information about the process and have the ability to adjust to commands from the business network. More and more, enterprises are leveraging this to improve efficiency and intra-organizational transparency.

Whereas it had traditionally been secured and protected from the threat of virus and worm infections by the fact of isolation, the control network is now increasingly at risk as a result of network convergence. This is because many control systems share the same underlying operating systems as are used in the business network. Compounding the problem is that many of today's control networks have been implemented in pieces. Most have no consistent security design and many were not designed for security.

As a consequence, the threats from both internal and external sources have increased significantly. Ernst & Young reported in their "Information and Security Survey" that 60% of organizations expect to experience greater vulnerability as connectivity increases.

There are, of course, numerous reasons to protect the control network and control system from threat. The technical knowledge, skills and tools required to penetrate business networks are widely available. If applied to the control network of, say, a refinery or nuclear power plant, the results could be devastating. In addition, there are increasing regulatory mandates and guidelines being issued the US Government (National Strategy to Secure Cyberspace-US Government page 32), as well as guidelines and best practices for securing plant control systems from advisory groups, such as ISA SP99 committee, NIST (Process Control Security Requirements Forum-PCSRF), NERC (North American Electric Reliability Council), among others.

An object of the invention is accordingly to provide improved methods and apparatus for digital data processing.

Another object is to provide such methods and apparatus as improve network hardening and/or provide further protection against network intrusion.

A still further object of the invention is to provide such methods and apparatus as can be implemented in the range of production environments extant today and in the future.

Yet a further object of the invention is to provide such methods and apparatus as can be utilized on a range of control networks.

SUMMARY OF THE INVENTION

The foregoing are among the objects attained by the invention which provides, in one aspect, an improved network for use in or with process control systems, computer-based manufacturing or production control systems, environmental control systems, industrial control system, and the like (hereinafter, collectively, "control systems"). Those networks utilize a combination of firewalls, intrusion detection systems, intrusion protection devices and/or other devices for defense against instrusion, or hardening.

For example, according to one aspect of the invention, digital data communications within a site (e.g., a plant or corporate facility) is supported by a network that is divided into two or more zones. One of those zones is a control network comprising control workstations, controllers, field devices and other process, manufacturing/production, environmental and/or industrial control equipment, or the like (collectively, "control devices") and network media supporting communications therewith and/or therebetween.

The other zone is a network having different connectivity requirements and/or traffic patterns than the control network. It may be, for example, a corporate local area network (LAN), an enterprise wide area network (WAN) or other business network (e.g., comprising personal computers, mainframe computers, personal digital assistants, servers, scanners, printers, and the like). It may also be coupled to the Internet or other public network, by way of non-limiting example. The site (or plant) network is segmented into those zones via firewalls, e.g., located at the respective zone boundaries. Intrusion detection and/or prevention systems are deployed at selected locations in and/or between the zones for (i) reporting network traffic indicative of potential intrusions, and/or (ii) blocking such traffic.

Related aspects of the invention provide a control network that divided into hierarchical zones, each providing differing security. For example, according to some aspects of the invention, such a network can be divided into a public (or Internet) zone, having the least security (relative to the other zones); a Data Center zone, providing more security (than the Internet zone), a Plant Network zone, providing still greater security (than the Internet and Data Center zones), and a Control Network zone, having the greatest security (relative to the other zones). Each zone is separated from the other zones, e.g., by a firewall or like device and, optionally, by an intrusion detection or protection system.

Further aspects of the invention provide control networks as described above in which firewalls (or like devices) that separate zones are sourced from manufacturers (or other sources) that differ from the firewalls (or like devices) used at the network perimeter.

Other aspects of the invention provide networks (for example, control networks, hybrid networks comprising both business zones and control zones, all by way of non-limiting example) as described above in which the intrusion detection and/or protection systems that separate the zones implement different security protocols from one another.

Where those protocols are signature-based, for example, a first such protocol can be used to implement security in zone that defines the "business" (or other enterprise-level) network and a second, separate signature-based protocol can be used in a zone in which workstations, controllers, field devices and other process control equipment communicate, e.g., with field devices and other process control equipment (i.e., the "control network" zone).

Still other aspects of the invention provide networks as described that provide improved intrusion protection. These networks incorporate firewalls or other intrusion protection devices in-line within each network or zone being protected. Alternatively, and/or in addition, the networks can incorporate workstations (or other host digital data processors) that implement host-based intrusion protection.

In other aspects, the invention provides control networks (or hybrid corporate/control networks) as described above that implement intrusion detection in addition to—or instead of—intrusion protection.

Related aspects of the invention provide methods and apparatus for signature-based intrusion detection and/or protection, e.g., in control networks. These utilize signatures unique to control networks to detect actual or apparent intrusions.

Yet other aspects of the invention provide methods for hardening process control systems and applications against hacking, intrusion or other mischievous conduct. According to one aspect of the invention, this includes one or more of selectively deactivating operating system and other services (e.g., ftp, etc.) that are and may not be necessary for normal and/or expected process control operation; executing a backup (e.g., preferably an incremental backup) to preserve current system status; testing system and/or application execution to determine whether it achieves normal and/or expected operation.

In related aspects of the invention, the aforementioned services are selectively and successively deactivated in order to harden the systems and/or applications. System (or application) operation is tested after each deactivation (and/or group of deactivations) until, preferably, all services not essential to normal and/or expected operation have been identified and deactivated. If testing reveals that a given deactivation (or group of deactivations) results in unexpected system (or application) operation, one or more of the services are re-activated and the methodology is resumed with the selectively and successive deactivation of other services.

According to a related aspect of the invention, once all services not essential to normal and/or expected operation are deactivated in accord with the methodology described above, the system is tested for penetration, e.g., in the manner of a hack, intrusion and/or other mischievous action. If penetration is occurs, additional services are deactivated and penetration testing re-executed.

Related aspects of the invention provide process control systems and devices (including, workstations, field devices, intrusion detection and/or intrusion protection systems) hardened against hacking, intrusion or other mischievous conduct in accord with the above methodology.

These and other aspects of the invention are evident in the detailed description that follows.

BRIEF DESCRIPTION OF THE DRAWINGS

A further understanding of the invention may be attained by reference to the drawings, in which.

DETAILED DESCRIPTION OF THE ILLUSTRATED EMBODIMENT

Figure 1:
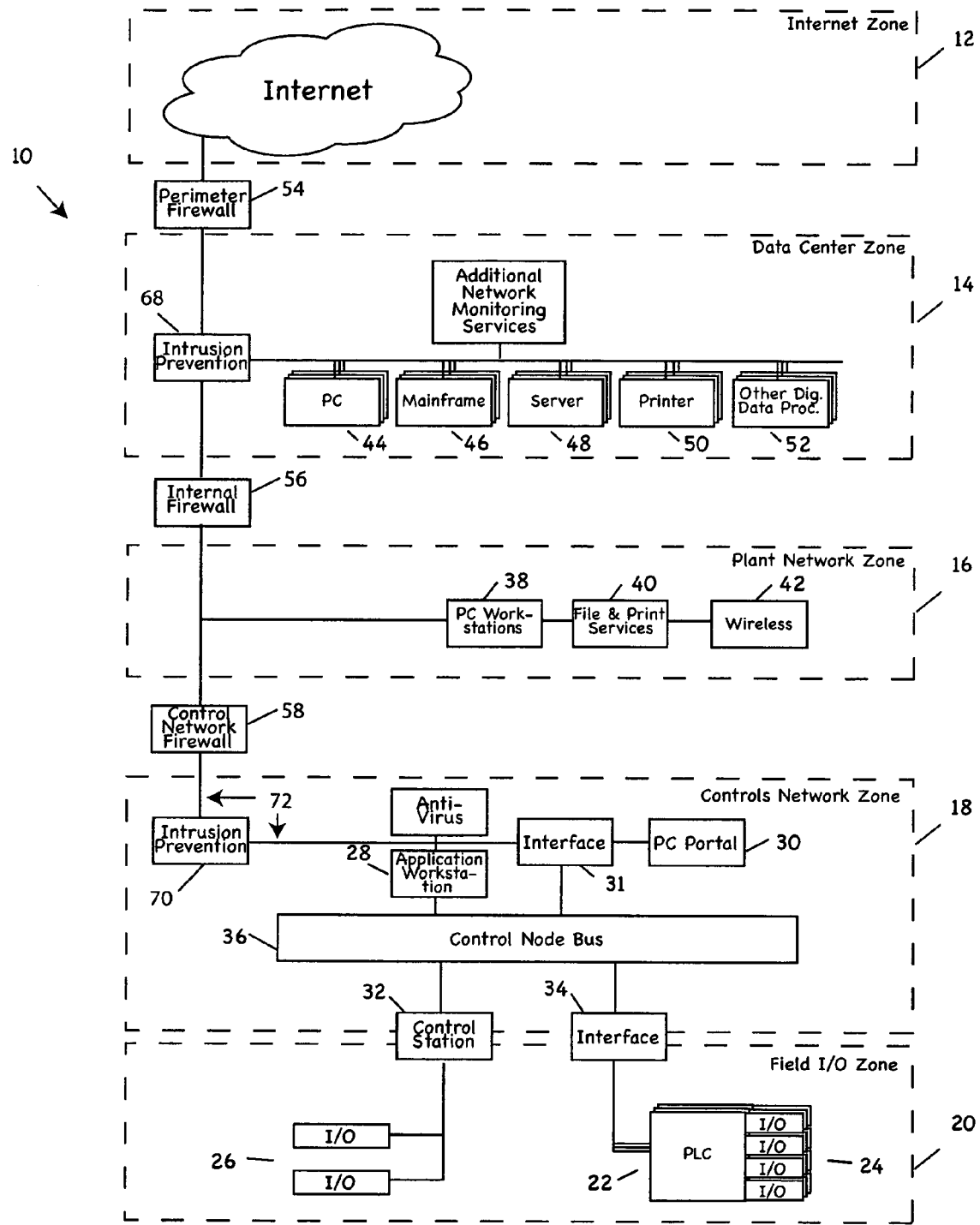
FIG. 1 depicts a network according to the invention supporting digital data communications between and/or with devices, e.g., located at a site such as a plant or corporate facility.

FIG. 1 depicts a network 10 according to the invention supporting digital data communications between and/or with devices, e.g., within an enterprise and/or located at a site, such as a plant or corporate facility, all by way of non-limiting example. Those devices and the portions of the network 10 supporting them are divided into five zones, though in other embodiments there may be greater or fewer. In the illustrated embodiment, those zones comprise an internet zone 12, data center zone 14, plant network zone 16, controls network zone 18 and a field I/O zone 20, though, in other embodiments the identity and nature of those zones may vary.

Illustrated field I/O zone 20 comprises control devices, such as programmable logic controllers 22 and field or input/output (I/O) devices 24, 26, by way of non-limiting example, of the type commonly used to monitor and/or control manufacturing, environmental, industrial and/or other such processes and/or apparatus in process control systems, computer-based manufacturing or production control systems, environmental control systems, industrial control system, and the like (hereinafter, collectively, "control systems"). The control devices 22, 24, 26 are coupled to actuators, sensors, and the like, e.g., that make up the system being controlled and/or form part (or the whole of) those actuators, sensors, and the like, themselves.

Communications on those portions of the network 10 in zone 20 are typically direct hardwired communications between the I/O devices and their controllers. Other embodiments may utilize wireless or other forms of communication. In addition, they may include other control devices and/or provide other functionality, in addition to or instead of the devices and/or functionality shown in the drawing and discussed herein.

Illustrated controls network zone 18 comprises higher-level control devices, such as applications workstation 28, personal computer 30 (and interface 31, as necessary) and/or other digital data processing equipment that execute applications to provide a monitoring and control interface to the control devices in zone 20. The digital data processors in this zone 18 may provide historical tracking functions, alarming capability and so forth, all in the conventional manner known in the art. The workstation 28, PC 30 and/or other digital data processing apparatus of zone 18 communicate with other nodes of the control system, e.g., control station 32 and PLC interface 34, via a control node bus 34 or other interconnect of the type known in the control arts and, preferably, utilizing a communications protocol standard thereto. Other embodiments may provide, in zone 18, other digital data processing apparatus and/or provide other functionality (such as illustrated anti-virus service and/or other monitoring services), in addition to or instead of that of devices 28 and 30 shown in the drawing and described above.

In the illustrated embodiment, zone 18 additionally includes and intrusion protection and/or intrusion detection functionality as described below. This is disposed on the "side" of zone 18 that interfaces with the plant network zone 16 and, more generally, one or more business networks of the enterprise. The network media supporting communications on this side of zone 18 may be configured as a local area network (LAN) and, possibly, as a wide area network (WAN), or other network arrangement known in the art, and may include Ethernet and/or wireless (among other media) supporting TCP/IP and other protocols.

At the interface of zones 18 and 20 of the illustrated embodiment are control station 32 and PLC interface 34, both of conventional construction and operation known in the art. Thus, for example, control station 32 of the illustrated embodiment executes control algorithms, e.g., under monitoring and/or supervisory control of applications workstation 28, PC 30 or other digital data processing apparatus, while interface 34 provides communications coupling between that workstation 28, PC 30 and other digital data processing apparatus, e.g., via bus 36. Other embodiments may provide other functionality, in addition to or instead of that of devices 32 and 34, at the interface of zones 18 and 20, or subsume that functionality into other apparatus present within those zones.

Typically, and in the illustrated embodiment, zones 18-20 comprise devices and network media largely (if not entirely) disposed at a single site, such as a plant or other corporate facility, though in other embodiments this may vary. Thus, for example, the devices and network of zones 18-20 may extend over a corporate campus or other geographical region; conversely, they may extend over just a portion of the physical premises of a single facility. Regardless of their actual physical or geographical coverage, network portions 18-20, and devices/applications placed in communications coupling thereby, are referred to here as the "process control network" and, more generally, the "control network."

Illustrated plant network zone 16 comprises personal computers 38, servers 40, wireless access services 42 and other digital data processing equipment of the type commonly used to support business applications and functions connected with a manufacturing, environmental control, industrial or other operation in which control systems are employed. Those applications can include, by way of non-limiting example, messaging, ERP, file & print sharing, and Internet browsing, and so forth. The digital data processing apparatus in this zone 16 may also support engineering, scientific and/or other computing applications and function used in connection with such operations. Other embodiments may provide, in zone 16, other digital data processing apparatus and/or provide other functionality, in addition to or instead of that of devices 38-42 shown in the drawing and described above. For example, this zone may include intrusion protection and/or intrusion detection functionality as described below. The network media supporting communications in zone 16 is typically configured as a local area network (LAN), wide area network (WAN), or other network arrangement known in the art, and includes Ethernet and/or wireless (among other media) supporting TCP/IP and other protocols, as is conventional in corporate or business networks.

Zone 16 may comprise devices 38-42 and network media largely disposed at the same "site" as the zones 18, 20. However, this zone may, too, span a different and/or wider geographical area, e.g., over multiple locations across a wide area network or otherwise. Regardless, and unless otherwise apparent from context, the terms "site," "plant" and "facility" are used synonymously throughout this application-as are the corresponding terms "site network," "plant network," "facility network," or the like, referring to network zone 16 of the illustrated embodiment and the devices 38-42 and applications placed in communications coupling thereby.

Illustrated data center zone 14 comprises personal computers 44, mainframe computers 46, servers 48, printers 50, and other digital data processing equipment 50 of the type commonly used to support business, governmental, or other enterprise operations. The devices 44-52 may support applications and functions of the type discussed above in connection with the plant network zone 16 or others applications and functions, all as is common in enterprise operations. Data center zone 14 may include additional services, e.g., implemented by a dedicated server or other device. These services include, by way of non-limiting example: network monitoring, content filtering, anti-virus, remote access, server monitoring, web usage reporting, wireless security, service level management, user management, server management, and/or anti-spam. In the illustrated embodiment, zone 14 additionally includes and intrusion protection and/or intrusion detection functionality as described below. The network media supporting communications in zone 14 is typically configured as a local area network (LAN), wide area network (WAN), or other network arrangement known in the art, and includes Ethernet and/or wireless (among other media) supporting TCP/IP and other protocols, as is conventional in corporate or business networks.

As above, zone 14 may comprise devices 44-52 and network media largely disposed at the same "site" as the zones 18, 20. As with zone 16, however, zone 14 may, too, span a different and/or wider geographical area, e.g., over multiple locations across a wide area network or otherwise. Regardless, the terms "enterprise network," "organization network," or the like, may be used to refer to network zone 14 of the illustrated embodiment and the devices 44-52 and applications placed in communications coupling thereby. More generally, the term "business network," "corporate network," or the like is used to refer to network zone 14 (and its associated devices and applications), network zone 16 (and its associated devices and applications), or the combination thereof.

The media used network 10 may be of the wired, wireless, or other varieties known in the art, or combinations thereof, for supporting communications between, to and/or from the illustrated devices. For sake of convenience, that media is referred to in the plural (to wit, "media") regardless of whether it constitutes one or more varieties and/or whether it constitutes a single network segment or mutliple segments.

Internet zone 12, in the illustrated embodiment, represents a public network, such as the Internet, or other network external to the enterprise or site and not subject to the network security measures discussed herein.

Network Segmentation

The illustrated embodiment takes a new approach to intrusion prevention for control systems and the control networks that embody them. That approach focuses on placement of firewalls, intrusion detection and prevention systems within and between control networks (e.g., zones 18-20) and the business (or other) networks (e.g., zones 14-16) with which those control network interface, e.g., at the site level and, more broadly, the enterprise level. Such combined networks are referred to herein as "hybrid networks," "hybrid control/business networks," and the like.

Segmentation of illustrated network 10 into the several zones 12-20, each of which has different a different set of connectivity requirements and traffic patterns, is attained through the use of firewalls, intrusion detection and prevention systems deployed as discussed below. Those zones provide the following levels of overall security:

Field I/O Zone 20—Communications that occur in this zone are typically direct hardwired communications between the I/O devices and their controllers. Security is accomplished by physical security means.

Controls Network Zone 18—This is the zone with the highest level of security. It is the network that carries the process control device communications. Traffic on this network segment must be limited to only the process control network traffic as it is very sensitive to the volume of traffic and protocols used.

Plant Network Zone 16—This zone carries the general business network traffic, (messaging, ERP, file & print sharing, and Internet browsing, etc.) This zone may span multiple locations across a wide area network. Traffic from this zone may not directly access the controls network zone 18.

Data Center Zone 14—This may be a single zone or multiple zones that exist at the Corporate Data Center.

Internet Zone 12—This is the unprotected public Internet.

Apart from the interface between the control network zone 18 and the field I/O zone 20, each zone is separated from the adjacent zones by a firewall. Thus, in the illustrated embodiment, perimeter firewall 54 separates internet zone 12 from data center zone 14. This is a firewall that controls the types of traffic to and from the public Internet.

Internal firewall 56 separates data center zone 14 from plant network zone 16. This is a firewall that controls the types of internal site-to-site traffic and site-to-data center traffic. It facilitates controlling or containing the spread of network born viruses, and provides an extra level of restricting the types of traffic that is allowed between sites. It also gives the ability to further protect the datacenter from internal intruders.

Control network firewall 58 separates plant network zone 16 from controls network zone 18. This is a hardware device which restricts the types of traffic allowed into and out of the control network zone 18. Rules are created in the firewall configuration to allow only the permitted traffic. The general rule of thumb is "deny everything and permit only the essential traffic."

The firewalls 54-58 are preferably managed in a consistent fashion to ensure that changes are documented. They are also preferably monitored 7×24, whether by a group within the enterprise or a third party provider. Appropriate event alerting and rectification process is put into place so that alerts are noted and can be acted upon. The firewalls 54-58 are also preferably configured to utilize a logging server to capture all firewall events either locally or in a central location. In preferred embodiments, the firewalls 54-58 are not used for services other than firewalls or VPN connectivity.

While the diagram illustrates a single firewall between each zone, additional ones may be utilized: e.g., a pair of high availability units in a fail over mode. Thus, for example, in implementations that require real-time or near real-time communications to the "Process Control Network"—a term used, here, to refer to the combined control network zone 18 and field I/O zone 20; though, in other embodiments, that term may refer to a single one of these zone or another combination (such as zones 16-20, or 16-18)—it is preferred that firewall 58, at a minimum, be a high availability or redundant unit.

Firewalls 54-58 can be of the type commercially available in the marketplace, albeit operated and arranged as discussed herein. In some embodiments, the security of zones 16-20 is enhanced by selecting a perimeter firewall 54 that is of a different manufacturer than firewalls 56, 58, since this typically provide maximum resistance to penetration.

Figure 2:
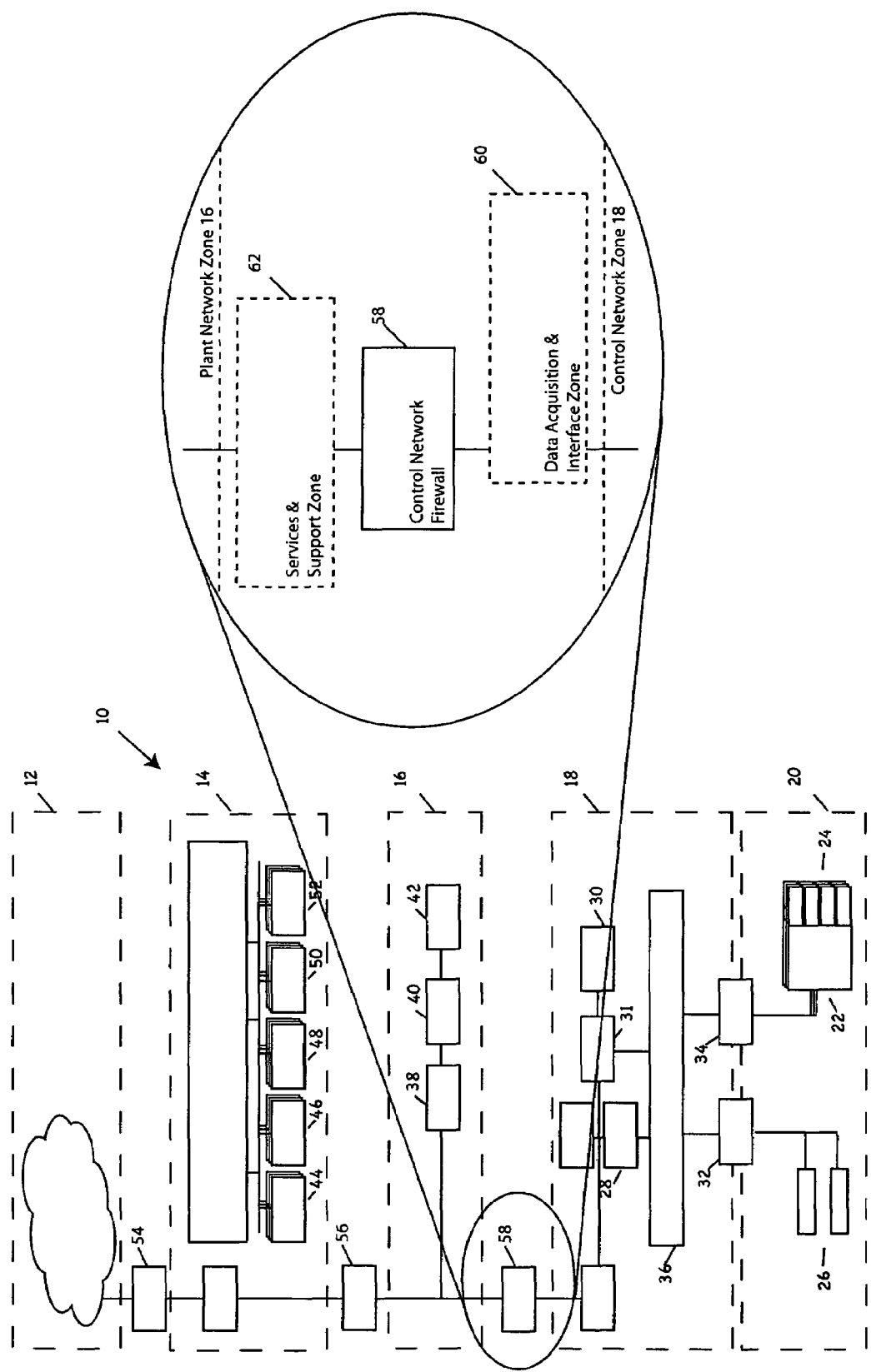
FIG. 2 depicts exemplary subzones between a plant network zone and a control network zone in a network of FIG. 1.

In practice, the firewalls can be configured to create additional zones, or subzones, to supplement the illustrated configuration. Referring to FIG. 2, two exemplary subzones 60, 62 are shown between the plant network zone 16 and the control network zone 18. Those skilled in the art will appreciate that other subzones can be used in addition or instead:

Data Acquisition & Interface Sub-Zone 60—This sub-zone is the demarcation point and interface for communications into or out of the Process Control Network (e.g., into or out of controls network zone 18). It contains servers or workstations that gather data from the controls network zone 18 devices and make it available to the plant network zone 16.

Service & Support Sub-Zone 62—This sub-zone is utilized, e.g., by support agencies when servicing the controls network zone 18. Like other connections to the Internet or other external network, this connection preferably uses strong authentication, encryption or secure VPN access. Modems utilized preferably incorporate encryption and dial back capability. Firewalls and other devices introduced to the network 10 in support of this zone preferably utilize updated anti-virus software.

Figure 3:
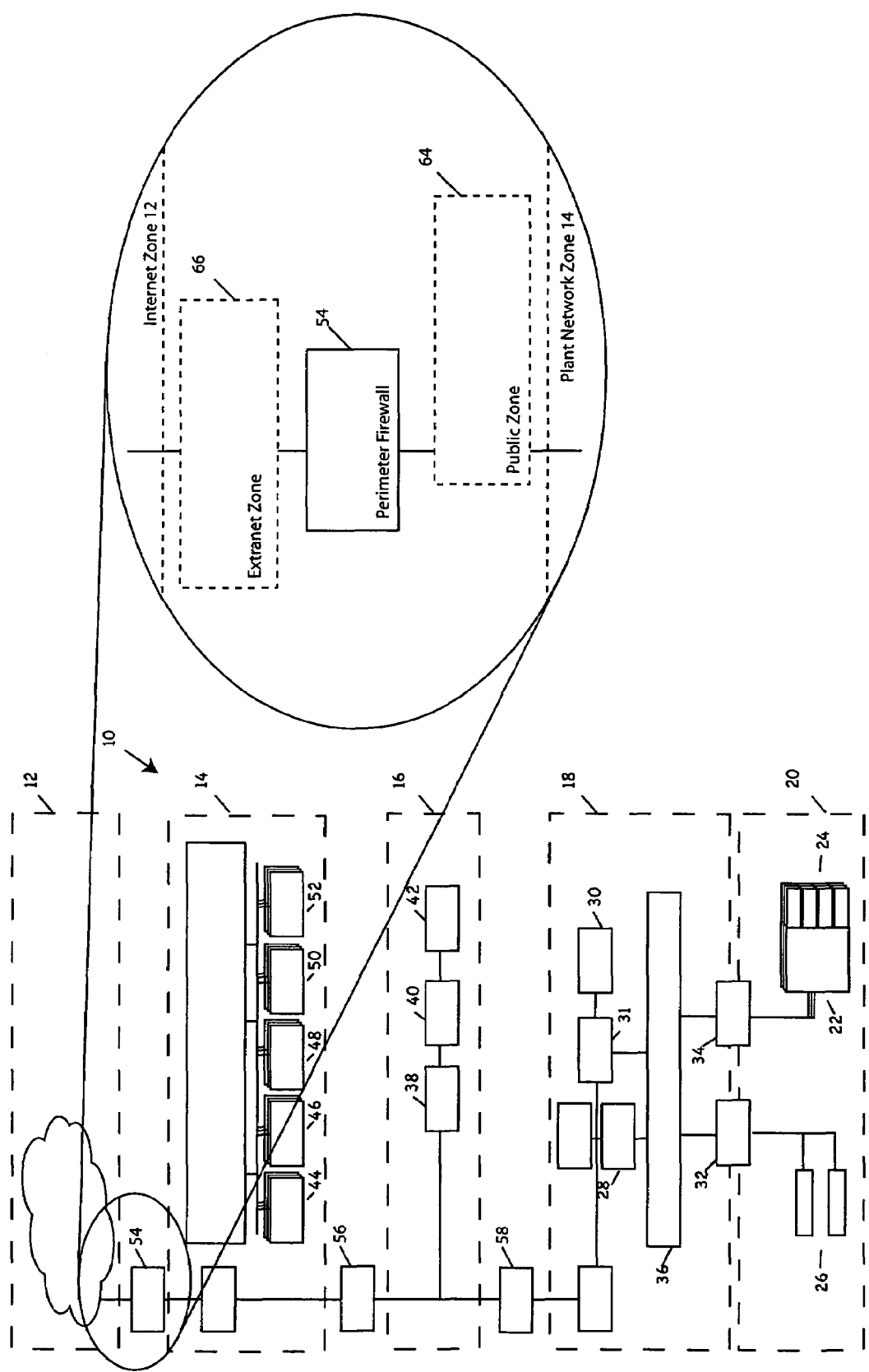
FIG. 3 depicts exemplary DMZs established between a data center zone and a public network in a network of FIG. 1.

Referring to FIG. 3, the perimeter firewall 54 can define "demilitarized zones" (DMZs) like those discussed below. As above, those skilled in the art will appreciate that other sub-zones can be used in addition or instead:

Public Sub-Zone 64—This is a sub-zone where public facing services exist. Web servers, SMTP messaging gateways and FTP sites are examples of services found in this sub-zone.

Extranet Sub-Zone 66—This is a sub-zone that is commonly used to connect to the business (or other organizational partners) of the enterprise (e.g., trading partners, customers, and so forth). These "partners" connect by various methods including dialup, private lines, frame-relay and VPN. VPN connections are becoming more common due to the proliferation of the Internet and the economy of leveraging shared services. Rules established in firewall 54 are used to further control where the partners are allowed to access as well as address translation.

Illustrated network 10 also includes intrusion detection system (IDS) and/or intrusion protection system (IPS) devices to detect signatures or patterns on the network that would indicate unusual traffic patterns. These are placed within the zones, e.g., IPS 68 within data center zone 14 and IPS 70 within control network zone 18, as shown in FIG. 1. IDSs may be used instead or in addition.

As those skilled in the art will appreciate, IDSs monitors packets on a network wire and determine if the seen activity is potentially harmful, such as a worm attack. A typical example is a system that watches for large number of TCP connection requests (SYN) to many different ports on a target machine, thus discovering if someone is attempting a TCP port scan. An IDS may run either on the target machine who watches its own traffic or on an independent machine such as an IDS appliance (also referred to as Host IDS).

An Intrusion Protection System (IPS) encompasses the same monitoring techniques used in IDS; however, it includes the ability to block the traffic that is deemed harmful. It prevents attacks from causing harm to the network 10—and, particularly, those portions of the network within zones 18 and 20, as well as the control system with which they interface—as a consequence of being positioned in-line, between the network media and devices being protection, on the one hand, and less secured networks, on the other hand. Like IDSs, IPSs can run in host mode directly on the control system station.

Additional devices for use in some implementations of network 10 are discussed below:

Routers: A device which forwards packets between networks. The forwarding decision is based on network layer information and routing tables, which are constructed either manually or automatically by routing protocols. Based on network requirements, routers may be utilized to connect the various network zones or segments either directly or utilizing telecommunications links. In preferred embodiments of the invention utilized in plants and similar environments, routers are typically not configured with access lists to mimic firewall functionality on a basic level. This is because routers lack a hardened operating system and do not have the robust capabilities of a true firewall.

Hubs: A multi-port broadcast device. It takes whatever comes in any port and broadcasts it out all the other ports. As network nodes are added or traffic increases, every node on the segment has a greater chance of slowing communication or having a collision. Additionally, since Ethernet nodes currently do not differentiate between the relative importance of Ethernet packets, it is possible for non-essential traffic on the network to slow or collide with essential traffic (such as inter-PLC communication, or HMI polling.) Switches Bridges: Bridges act as "gatekeepers" between two collision domains. By being physically wired into both LANs, this device is able to discern the source and destination address of an Ethernet packet. The bridge is also capable of "mapping" the locations of Ethernet nodes on either side of itself. By linking a control network and an office network with a bridge, traffic can be stopped that is meant to travel between two computers in the office LAN from burdening devices on the other side of the bridge. When traffic occurs that is addressed for a device on the other side of the bridge from the originating address, the bridge will allow this traffic to pass. Compared to the completely shared network, the bridged network can reduce, but not eliminate, the opportunity for collisions and network slowdowns.

Switches: A switch is a multiport device which has the ability to "read" the address portion of an Ethernet packet and then send the packet out the port on which the destination node resides. Most modern switches have buffers that allow them to store and forward the Ethernet packets that are sent to it. Each port of the switch can connect either directly to a node or to a hub(s) which can also have multiple nodes connected to it. Modern switches are capable of learning the unique addresses of devices attached to them or to a hub which in turn is then attached to the switch without any programming. If a PC or PLC is plugged directly into a switch, the switch would only allow traffic addressed to that device to be sent down the connection cable to the device. By controlling the flow of information between ports, switches improve bandwidth utilization by reducing the number of collisions. It is important to note that the control network communicate using the MAC address layer and that some consumer grade switches do not fully implement the standard and may not allow these devices to communicate. Generally speaking commercial grade switches do not have this issue.

Media Converters/Media Access Unit (MAU)—Devices utilized to connect various media types such as fiber to ThinNet to form a contiguous network.

Modem—Devices utilized to connect devices asynchronously for out of band access to devices. In embodiments of the inventor used in plants and plant-like environments, modems are equipped for dial back and employ encryption techniques.

Wireless Access Points—Radio base stations that are used to connect to the hard-wired network. The illustrated network 10 utilizes securely implemented wireless. Solutions provided are capable of both preventing unauthorized access and ensuring that data transmitted is encrypted to prevent "eavesdropping". For maximum flexibility, the devices selected are capable of data encryption with dynamic or rotating keys, MAC address filtering & blocking, disabling SSID broadcasting, and complies with 802.11 & 802.1x standards. Consumer grade equipment is not preferred. Moreover, VPN connections are established with software clients in lieu of WEP or proprietary data encryption. This allows supporting multi-vendor wireless hardware with a common solution.

VPN Concentrators—Devices that encrypt the data transferred between the concentrator and another concentrator or client based on a mutually agreed upon key. This technology is most wildly used today to allow remote users to securely access corporate data across the public Internet. The same technology can be used to add additional security accessing data across wireless and existing corporate WANs. In lieu of a separate VPN concentrator, it is possible to utilize VPN services that are integrated with the firewall.

Firewall Configuration

Firewalls utilized in the network 10 are configured as described further below. Firewall selection, ruleset configuration and operational policies are made with respect to I/A Series process control systems (available from the assignee hereof, Foxboro/Invensys plc), network and its interfaces to a corporate network (e.g., including an Ethernet network topology), though it will be appreciated that such selections, or the like, are applicable to systems, networks and interfaces from other sources.

Demilitarized Zones (DMZs)

In the illustrated embodiment, perimeter or external firewall 54 is used to create special isolated zones referred to as demilitarized zones (DMZs). A DMZ is a small network inserted as a "neutral zone" between a company's private network and the outside public network. This DMZ contains public facing web or ftp servers. While this DMZ is an optional zone, it provides a more secure approach. It gives greater flexibility and much finer granularity for the firewall ruleset to further control the traffic that flows through it. Firewall 54 can be used to create DMZs for other applications, as well. An example is to create an Extranet DMZ. As noted above, this can be used enterprise's partners, restricting what they can access on the company network.

The inventors have extended this to the internal firewall used to isolate the control network. Referring back to FIG. 2, firewall 58 is located between the plant or business network (zone 16) and the control network (zones 18, 20). DMZ 60 is created that contains the data collection and reporting servers, which will be accessible from the business network (zone 16). Only these servers will be allowed to communicate with the control network (zones 18, 20). DMZ 62 is also created to permit control of the control network via remote administration and service connections.

Firewall Rules

Firewalls within network 10 are configured using rules, i.e., definitions of what types of traffic should be allowed in or out of the secured network zones. While the exact method of configuring the firewall varies from firewall manufacturer to manufacturer, the illustrated embodiment utilizes one (or more) of the following rules to restrict the traffic to the network zones. Where possible (e.g., permitted by the specifics of the firewall design), multiple rules are combined to provide more in-depth protection.

Packet Filter

A packet filter is a type of firewall. Packet filters can restrict network traffic and protect the network by rejecting packets from unauthorized hosts, using unauthorized ports or trying to connect to unauthorized IP addresses. Packet filters only check the packet header to determine the source and destination address and the source and destination ports to verify against its rules.

Stateful Inspection

Stateful Inspection packet filtering or Stateful Packet Filtering (SPF) is a more in-depth form of a packet filter firewall. Stateful Inspection firewalls check the packet all the way to the Application Layer and monitor incoming and outgoing packets to determine not only source and destination, but also context. This ensures that only requested information is allowed back in. Stateful Inspection helps protect against hacker techniques such as IP spoofing and port scanning.

SPF first looks at more details from each packet than packed filtering. This allows the determination of what is contained within the packet rather than simply who and where it is from (or allegedly from). SPF monitors communications between the two devices and compares the traffic not only to the rules it has been given, but also to the previous communications. If any communication seems out of context or out of the ordinary based on previous traffic the packet is rejected.

Proxy

A proxy service is generally put in place to boost performance of the network, but can act as a sort of firewall as well. The proxy service hides internal addresses so all communications appear to originate from the firewall itself. The proxy has the ability to provide faster user response by maintaining a cache of recently requested pages locally.

For example, If user A goes to google.com the proxy actually sends the request to google.com and retrieves the web page. When user B initiates a request to connect to google.com, the proxy sends the information it has already retrieved for user A. The proxy has algorithms to ensure that current data remains in the cache. The effect is that the page is returned much faster to the user than having to get it from google.com again.

A proxy can also be configured to block access to certain web sites and filter certain port traffic to protect the internal network.

There are two types of solutions that are called Proxy servers. One is an application that is loaded on a PC based server. The second is a feature incorporated into a firewall. For purposes of the illustrated embodiment, the application that is loaded on a PC server is not generally considered a solution for providing security on the network 10 (and, particularly, the control network), but does provide the acceleration benefits outlined above. More generally, in embodiments where a proxy is used, it is incorporated into a hardened firewall solution.

Application Gateways

Application gateways are a variation of a proxy server and functions as follows: The internal client first establishes a connection with the application gateway. The application gateway determines if the connection should be allowed or not and then establishes a connection with the destination computer. All communications go through two connections: 1.) client to application gateway and 2.) Application gateway to destination. The application gateway monitors all traffic against its rules before deciding whether or not to forward it. As with the other proxy server types, the application gateway is the only address seen by the outside world so the internal network is protected.

Firewall Rules Design

Firewall rules utilized in the network 10 were set with a policy that started with a totally locked down configuration (i.e., where nothing is permitted thru the firewall). Then, only the minimum ports necessary for the requisite applications to function were opened. The policy by which those rules were developed, further, called for identifying data flow requirements from all zones (12-20). In this regard, suppliers of software used in the network were typically relied on toe provide port and protocol information about their application. Where that was not possible, network sniffers were employed to identify the ports and protocols used.

The aforementioned lockdown policy was extended into the DMZ, e.g., 60, 62, of the illustrated embodiment. This is unlike prior art practices, where firewall ruleset designers take a false sense of security with DMZ and allow too many ports to be opened. The inventors have discovered that it is necessary to keep in mind what risk is presented if the server in the DMZ is compromised.

Equipment Selection

Firewalls 54-58 utilized in the illustrated embodiment are reliable. Preferably, they do not utilize disk drives and other mechanical components and, therefore, have a lower probability of failure. Alternatively, or in addition, high availability options are utilized in embodiments where communications with the control network (zones 18, 20) are critical and requires 100% uptime. In any given implementation, this is evaluated at the risk assessment stage of design: will the control network continue to operate if connectivity to the business network is lost?

Management of Firewalls

The firewalls of the illustrated embodiment are actively managed. They are updated, for example, when manufacturer updates are released. Their event logs are monitored, as these events are good indications of someone or something that is trying to access devices across the firewall that is outside of the rules. While this is usually an indication of a misconfigured application, it may also be an indication of a worm or a possible intruder on the network. Monitoring may be by person or person internal to the enterprise, or an outsourced to a partner.

Configuration Management

The illustrated embodiment utilizes a policy for firewall configuration and change management. This provides accountability for the changes made to the firewall ruleset. Documentation of the types of rule changes, when and why they were made are kept. Thus, for example, when additional ports are opened, e.g., to test for compatibility with new applications and/or devices on the network, a log of those ports is kept in order to insure that unnecessarily opened ones will subsequently be closed.

Using Firewalls For Other Services

The firewalls of the illustrated embodiment and, particularly, firewall 58 protecting the controls network zone are not utilized for other than firewall services. In this regard, it will be appreciated that it is possible to utilize the firewall to provide other services such as virus scanning or spam filtering. The inventors have found that this is not a recommended practice, particularly within the process control environment defined by firewall 58. In some embodiments, however, that firewall can support a limited number of VPN connections to provide access to the control network from clients within the business network (e.g., once all security implications are taken into account).

Security Hardening

Hardening of network 10 is achieved by following principles of designing and developing multiple layers of network, system and application security; exercising prevention within control system networks, supported by detection; viewing security from both management and technical perspectives; ensuring security is addressed from both an IT and control system perspective; and/or ensuring industry, regulatory and international standards are taken into account. In preferred embodiments of the invention, as many of these principles are exercised in network implementation as can be (given the particulars of the site).

The aforementioned I/A Series systems are deployed on two platforms: Sun Solaris and Microsoft Windows operating software. Securing these effectively requires striking a balance between the degree of security and the level of usability and functionality required. Although there are exceptions to the following general rule, it is often true that as the security and reliability of a computer system increases, its usability and functionality decreases. As the Sun Solaris and Microsoft Windows include security features at their core (including the ability to disable or enable operating software services), the initial approach to improving security of the network 10 and, particularly, for example, the control network (zones 18, 20) involved determining security settings that could be tuned without negatively affecting operational requirements of the devices and applications in the relevant zones on the network.

Figure 6:
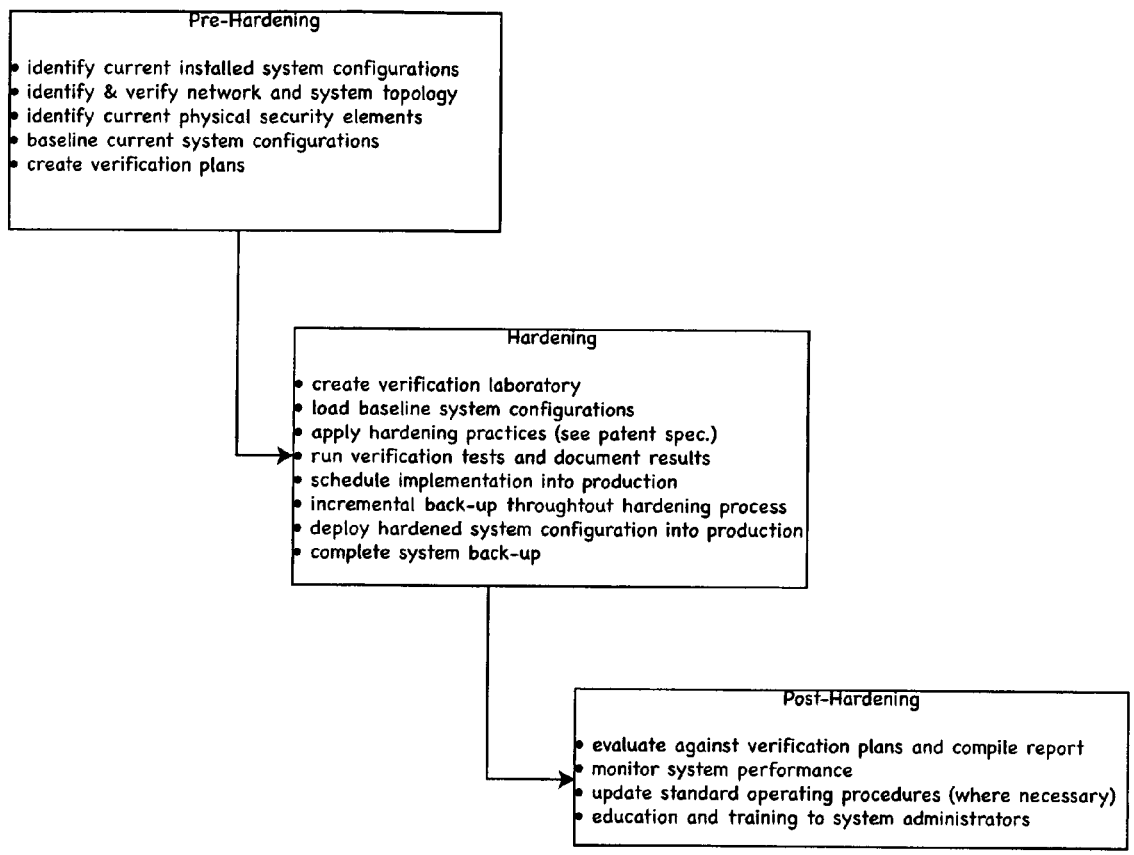
FIG. 6 illustrates a procedural approach to hardening the network of FIG. 1.

FIG. 6 illustrates a procedural approach to hardening network 10. This is applicable to control networks, as well as hybrid business/control networks as illustrated in FIG. 1.

Intrusion Detection and Prevention

The illustrated embodiment takes a new approach to intrusion prevention for control systems and the control networks (e.g., zones 18, 20) that embody them. That approach focuses on placement of intrusion detection and prevention systems within and between control networks works and the business or other networks (e.g., zones 14, 16) with which those control network interface, e.g., at the site level and, more broadly, the enterprise level.

Intrusion Detection

In some embodiments, network 10 uses Intrusion Detection Systems (IDS) where the control system network, e.g., network zones 18, 20 (and other critical networks) are connected to TCP/IP-based local and wide area networks, e.g., zones 14, 16. These IDSs detect adverse network activity-such as hacking attempts, virus and worm attacks, and other potentially threatening traffic capable of wreaking havoc on process control systems-and, when detected, generate an alert indicating that a threat has been detected.

Preferred IDSs used in embodiments of the invention detect threats through "signature" detection. Signatures are a collection of known symptoms of a known attack. For example, a signature attack would be if a hacker is attempting multiple passwords to access a system. IDS systems used in the illustrated embodiment, for example, can detect that someone is connected to a system and is receiving numerous "bad password" or "login failure" messages, often signaling a hack attempt. IDSs providing this capability are available in the marketplace; signatures used in the illustrated embodiment for protecting control networks are detailed below.

To prevent excessive false positives and negative reporting, IDSs used in embodiments of the invention are configured for the particular implementation environment. For example, where an IDSs is used to protect a control network with control devices based on the Windows operating system, the IDSs are disable from reporting attacks that would only affect UNIX systems.

Embodiment of the invention also beneficially uses IDSs in conjunction with Intrusion Protection Systems (IPSs), discussed below. Whereas the former are configured to detect potentially adverse traffic and alert the operator, the latter are intended to detect such traffic and block it. The IDSs of such embodiments are configured to utilize signatures to recognize anomalies, through patterns of "suspicious activity," and to notify the operator accordingly. This can be preferred over outright blocking (as in the case of IPSs), since some anomalies may actually be legitimate traffic, the blocking of which could affect the effectiveness or safety of the process control system.

The IDSs used also, preferably, provide detailed reporting of events. Thus, utilizing reporting capabilities provided in IDS systems available in the marketplace, those used in conjunction with control networks (and hybrid business/control networks) according to the present invention, present forensics such as a packet capture of the attack—in addition to source, destination, and protocol used in an attack. IDSs used in embodiment of the invention also, preferably, correlate similar events and identify them as a single attack, rather than reporting a single attack from a hacker. This allows for alarm consolidation which results in fewer pages or notifications being sent out.

Inline Intrusion Protection

The IDSs of the illustrated embodiment not only detect threats, but mitigate them by blocking adverse traffic carrying them. Such IDSs, commonly referred to as Intrusion Protection Systems (IPSs), are commercially available in the marketplace and are used in the illustrated embodiment, along with and/or instead IDSs.

Use of IPSs 68, 70 in the illustrated embodiment is preferred, e.g., over firewalls themselves. For example, a firewall can be configured to allow telnet for remote access to a control system. It will log all the connections related to telnet, but it can't determine what someone—an intruder or otherwise—is doing within that connection. A hacker could be using telnet to gain access to the system and the firewall wouldn't think twice about allowing it. Use of an IPS at the interface of a control network and/or on a business network that interfaces with a control network permits not only detection of attempts to hack into the network (e.g., the hacker's use of multiple passwords), but also blocks those attempts by shutting down the telnet connection.

IPSs 68, 70 provide real-time blocking of traffic that can harm a control network. There are many types of attacks that can bring down a system with a single packet. Simply detecting such packets and alerting the operator may not be sufficient. Recent attacks of this nature include the SQL Slammer and MyDoom attacks affecting Microsoft Windows products. To prevent the IPSs from blocking legitimate traffic on the control network, they are preferably configured to block attacks that are well-defined and not anomaly based.

IPSs 68, 70 are employed in-line, meaning that affected network traffic must traverse the IPSs, e.g., before getting to—or through—the control portion 18 of a site network 16. To avoid loss of connectivity in the event of IPS failure, IPSs employed in the illustrated embodiment preferably provide "fail open" or "fail closed" modes of failure-mode operation. These determine whether or not traffic will pass the IPS in the event of fault. Typically, the IPSs employed in the illustrated embodiment are configured for "fail close," thereby blocking or locking down a protected control network in the event of IPS failure.

In those embodiments where this is not preferred or desirable (e.g., because it would prevent the control devices on the control network from receiving set points or other safety-critical information from the business network to which the control network is connected), a "fail open" mode can be selected. Preferably, however, in cases where the control system is responding to setpoints or other critical information from the business network, a high availability IPS is utilized to ensure that secure connectivity continues even in the event of a point failure.

Host-Based Intrusion Protection

In addition to intrusion detection and/or in-line intrusion protection devices—which monitor the control network and/or business network to which it is attached for attacks and which are independent from the control system itself—the illustrated embodiment utilizes host-based intrusion protection on one or more of the digital data processors (e.g., workstation 28, PC 30, and so forth) that make up the control network 18. Such protection can also be used on the digital data processors (e.g., workstation 38, servers 40, 48, PC 44, mainframe 46, and so forth) of the business (or other) network to which the control network is attached. Host IPS offers a "last resort" protection for the devices within these zone. If a hacker is able to compromise the respective firewalls 54, 56, 58 and the network-based IPS 68, 70 have failed or has been compromised, host-based IPS still offer protection. In the illustrated embodiment, this works by making a baseline of the operating system and applications on each device and blocking any traffic coming from the network 10 that could potentially interrupt the recorded "norm."

Requirements Summary

Both business networks and control networks impose the same basic requirements for intrusion detection and prevention: to prevent unwanted or malicious traffic. However the impacts of an intrusion in each environment are very different. On a business network, an intrusion may result in the loss of data, or interruption of the ability to transact business. Control networks, on the other hand, carry real time data which often operates mission critical processes. Intrusions on the control network may have effects ranging from loss of production to safety issues resulting in injury. Depending on the severity of the event, environmental damage may occur or loss of life resulting in legal action.

To protect the control network (zone 18) against the complete spectrum of threats and vulnerabilities, IPS 68, 70 (and IDSs that may be used in embodiments of the invention) meet the following requirements: intrusion detection accuracy; prevention is required—not just detection; must cover a broad range of attacks; analyze all relevant traffic; utilize highly granular detection and response; flexible policy management; scalable threat management; sophisticated forensics and reporting; maximum sensor uptime; wire speed performance.

IPS Implementation

Host-Based IPS

As mentioned above, host-based IPS provides an added level of protection on the operating system side of the network 10. The host-based IPS is normally installed as an application that starts with the operating system of each applicable device. As with network IPS (discussed below), host-based IPS utilize signature or anomaly-based detection. In preferred embodiments, anomaly-based detection is employed on hosts in order to avoiding consuming their processing resources listening to and identifying all network traffic. Moreover, since the host system knows what is permissible and what is not, it is easier to shut down anomalies.

Network-based IDS/IPS Placement Options

The text that follows outlines physical options for placement of an IDS/IPS between the business network and control network and, more specifically, between plant network zone 16 and controls network zone 18.

Figure 4:
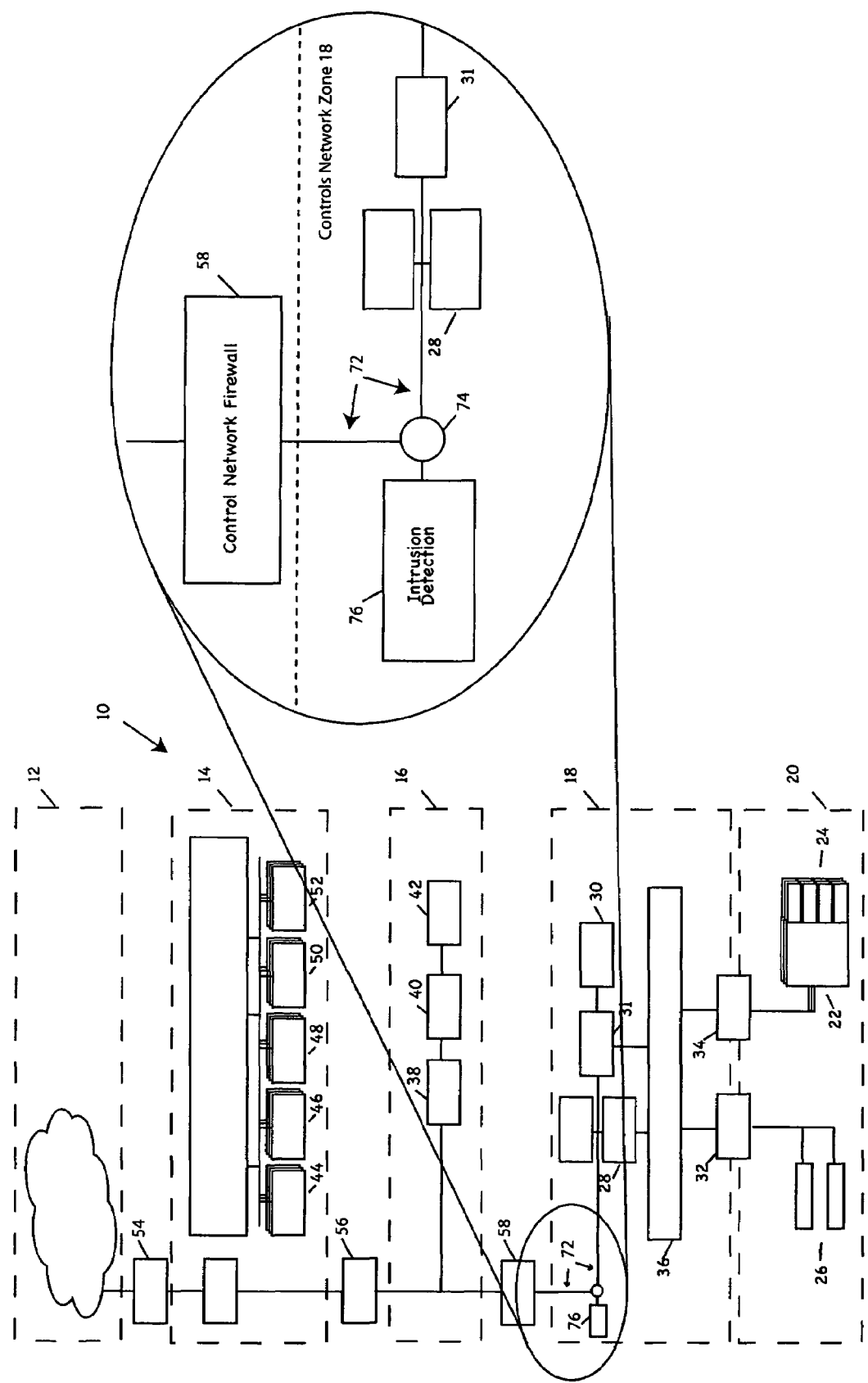
FIG. 4 depicts a "tap" mode configuration for an intrusion detection device in a network according to the invention.

Referring to FIG. 4, the "tap mode" is illustrated. This mode allows monitoring of existing network traffic between plant network zone 16 and controls network zone 18 on a physical link in the network, here, labelled 72, without interrupting it. This mode provides intrusion detection (not prevention) by IPS 70—here, labelled 76 to signify that differing role and/or to signify the use of alternate equipment.

Figure 5:
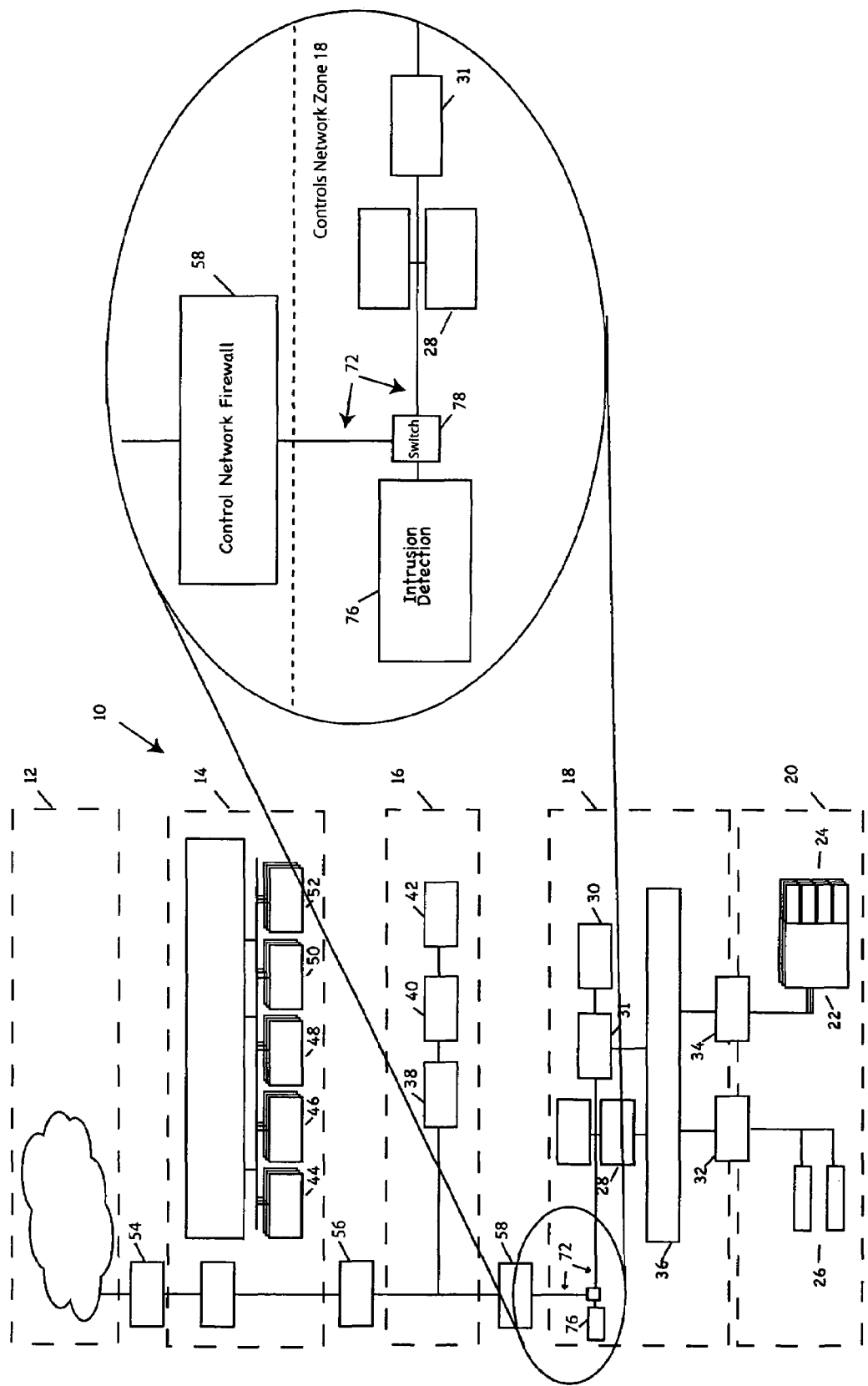
FIG. 5 depicts a "mirror" mode configuration for an intrusion detection device in a network according to the invention.

Referring to FIG. 5, "mirror mode" port mirroring is illustrated. Like tap mode, this does not allow for prevention, only detection—here, again, by IDS 76 (which, again, may comprise IPS 70 taking a differing role and/or the use of alternate equipment). It requires that a switching device 78 interconnecting the network to the IDS 76 allow for mirror or spanning or, alternatively, use a hub (not shown) as opposed to a switch.

Inline mode is illustrated in FIG. 1. This places the IPS 70 on the physical link 72 in between the business network and the control network being protected. This is similar in design to tap mode. However in this implementation, all traffic physically must pass through the IPS 70. This allows the IPS to shutdown any offending network connections and, hence, to serve as an IPS. It will be appreciated that even in this mode, the IPS 70 can be configured to serve as an IDS for some network occurrences (e.g., where a signature or combination signatures do not obviously signify an attack), yet, as an IPS for other network occurrences.

Preferred embodiments of the invention utilize this inline mode, with signatures as described below for optimal protection. The IPS 70 is "tuned" by removing protocols not required for network operation, removing signatures for operating systems and applications not in use, and to insure that the IPS permits (permitted) traffic to pass at a rate that meets bandwidth requirements.

In a given embodiment of the invention, the decision of whether to use IDSs (e.g., in configurations shown in FIGS. 4 and 5) or an IPS (e.g., in the configuration shown in FIG. 1) depends on a number of factors, e.g., whether IDS alerts (as opposed to IPS blocking) contain enough information to suit site policy requirements; whether alerts be delivered via an e-mail or paging system (or otherwise delivered quickly enough to be acted upon by site personnel); whether alerts be generated on a path other than the network connection supporting the IPS (back door access); whether the IPS perform an action such as modify a firewall policy or send SNMP traps.

When used, IPS 70 is selected in accord with its network bandwidth capability, as well as number of physical connections; speed of the physical connections needed (throughput); speed of the combined physical connections (aggregate throughput); and special IP network constraints such as VLAN use. Moreover, the following steps are followed in order to facilitate proper implementation:

Vulnerability assessments: The IPS 70 is periodically tested for any known vulnerabilities to ensure that its operation is uninterrupted. A close relationship with the IPS manufacturer insures identifying known vulnerabilities and remedying them quickly.

Periodic audits of security policy: Security is treated as an on-going process, dictating that the security policy is updated to contain new protocols, applications, and user access levels.

Change control: A rigid set of change controls on the IPS 70 are maintained. The configuration is documented, as are any changes.

Testing signatures: Generic IPS signatures are tested before prevention/blocking is enabled. Testing of custom signatures is also done to ensure that alerts are generated when required.

Updating signatures: As the IPS manufacturer updates signatures for new attacks, they are collected and tested. Once determined to apply, those signatures are installed in IPS 70.

Analyzing alerts/responses: Alerts sent by the IPS (or IDS) are analyzed by skilled personnel who can identify hacking attempts. This includes analyzing alerts sent by the IPS, collecting the forensics, and delivering them to proper authorities.

System monitoring: The IPS 70 permits a remote system to monitor the health of the device and to notify site personnel, e.g., by e-mail or pager, in the event of apparent fault.

Signature Definition

IPS 70 and, where used, IDS 76 utilize signatures to detect potential intrusions in the network (e.g., zone 18). Commercially available IPS and IDS devices are normally supplied with signatures for detecting anomalies on a typical business network. IPS 70 and IDS 76 use, in addition to those "generic" signatures, specific signatures that enable them to detect anomalies or unusual traffic on the control network, e.g., in zone 18.

As those skilled in the art will appreciate, a signature is a set of checks (for example, string matches, IP port comparisons, patterns of packets or subpackets, and so forth) that are applied to network traffic seen by the IDS/IPS. Signature-based detection relies on comparison of traffic to a database containing signatures of known attacks. The IPS 70 use signatures to identify "attacks"—that is, combinations or aggregations of signatures and, where appropriate, supporting/corroborating data regarding a given network event—in order to determine whether the event represents an intrusion. By validating the occurrence of several signatures in a typical attack, false positive detections are minimized. Of course, where intrusion is evident from a single signature, the IPS 70 can rely on that single signature, as well, to determine that attack has (or is) occurring.

IDS 76 can similarly rely on combinations or aggregations of signatures (and supporting data) in identifying attacks and, therefore, avoiding false positives. However, since the IDS is responsible for reporting, not blocking, potential intrusions, the adverse consequences of false positives is typically lower. Hence, depending upon implementation, IDS 76 can be configured to signal attacks "more liberally" than an IPS, i.e., based on occurrence of fewer signatures (and less corroborating data, if any) associated with a given event.

As noted above, the IPS 70 can be configured to serve as an IDS for some network occurrences, e.g., where a signature or combination signatures do not obviously signify an attack), and an IPS for others. In this regard, the discussions above concerning both IDSs and IPSs is germane.

Signatures

The IPS/IDS devices used in illustrated embodiment include, for example, 1700 attack definitions focused on business network-specific services. These are made up by some 2400 signatures. The following table lists examples of these signatures.

| Protocol or Service | Signature Description |
|---|---|
| TFTP | W32/Blaster Worm |
| TFTP | Nimda Worm Attack |
| DNS | NXT Buffer Overflow |
| RPC | AUTOFS Remote Command Execution |
| RADIUS | User Name Too Long |
| RADIUS | User Password Too Long |
| FINGER | Bomb Attack |
| FTP | CWD ~root |
| FTP | FTPD x86 Linux Buffer Overflow |

Significantly, as noted above, IPS 70 and IDS 76 use, in addition to generic signatures, specific signatures that enable them to detect anomalies or unusual traffic on the control network. The following table lists these "custom" signatures. While these were developed for use in connection with I/A Series process control systems (available from the assignee hereof, Foxboro/Invensys plc), it will be appreciated that they, or the like, are applicable to systems, from other sources.

| Protocol or Service | Signature Description |
|---|---|
| TELNET | Root Login with Wrong Password |
| TELNET | Attempt to Login with IA Standard Username |
| TELNET | Attempt to Login with IA Standard Password |
| FTP | Attempt to Login with IA Standard Username |
| FTP | Attempt to Login with IA Standard Password |
| REXEC | Account Login Attempt |
| MAC | Traffic originating from unknown MAC addresses |
| IP | Traffic originating from unknown IP addresses |
| IA DATA | Attempt to change specific IA setpoints out of range |

Still additional custom signatures are provided in the table below. As above, there were developed for use in connection with the I/A Series process control systems, but they, or the like, are applicable to systems, from other sources.

| Service or Protocol | Signature Characteristic | Reason |
|---|---|---|
| TELNET | Any login with the password gnomes | No outside the plant access to second enet |
| TELNET | Attempted login Administrator password password | PC based (AW70) must use password (lower case) |
| TELNET | Attempted login fox password gnomes | PC based must use password of gnomes |
| TELNET | Attempted login account hstorian | hstorian (correct spelling) is a user that must exist |
| TELNET | Attempted login account bpm | |
| TELNET | Attempted login account pam | |
| TELNET | Root Login with Wrong Password | |

-continued

| Service or Protocol | Signature Characteristic | Reason |
|---|---|---|
| TELNET | Attempt to Login with IA Standard Username | |
| TELNET | Attempt to Login with IA Standard Password | |
| FTP | Attempt to Login with IA Standard Username | |
| FTP | Attempt to Login with IA Standard Password | |
| FTP | file name sam | PC password location |
| TFTP | file name sam | PC password location (Variation of Bud's suggestion) |
| FTP | file name passwd | password files in Unix |
| TFTP | file name passwd | password files in Unix (Variation of Bud's suggestion) |
| FTP | file name dmpasswd_cfg | password files in display manager |
| TFTP | file name dmpasswd_cfg | password files in display manager (Variation of Bud's suggestion) |
| IP | Traffic originating from unknown IP addresses | |
| MAC | Traffic originating from unknown MAC addresses | |
| MAC | Allow only 6ccxxxxxx | The IA system "owns" the 6 cc block of macs for fault tolerant stations |
| REXEC | Account Login Attempt | |
| Data payload | Packet payload contains "setpars" | These functions allow setting of control variables |
| Data payload | Packet payload contains "omset" | These functions allow setting of control variables |
| Data payload | Attempt to change specific IA set-points out of range | |

It will be appreciated that additional signatures (control network-specific, or otherwise) can be used, in addition to or instead of those listed above. In this regard, the following verification exercises are suggested for any proposed additional control network-specific signatures:

Use traffic generation tools or packet dumps to verify that the Signature(s) match the traffic it is intended to detect.

Verify that the Signature is not duplicating functionality already provided by the IDS/IPS sensor and examine whether the test traffic raises the standard delivered alerts in addition to the User-Defined Signature alerts.

Deploy the Signature to a non-production IDS/IPS sensor connected to either a test network that duplicates the production network traffic or a non-production IDS/IPS sensor connected to the production network in Span or Tap mode (see FIGS. 4 and 5).

New signatures may range from checking the value of a header field to highly complex checks of different information in a specific order. It is suggested that the following information be available to aid in creating an further signatures: reason for creating this Signature; technical information references for this Signature (see below); protocol in which the traffic the Signature will search for occurrences (also known as the impact protocol); specific hardware or software platforms affected by this traffic; severity of this event; the direction in which the traffic to be watched for occurs; specific criteria that comprise the Signature, such as field values and patterns to match; action to be taken when the Signature is detected; a method, data, or tool to be used for testing the Signature.

As further signatures may be based on an advisory or some other description of a known vulnerability, it is advisable to have available whatever information can be found regarding the attack (or other condition) the Signature will be used to detect. This can include traffic dumps of an attack in progress or the exploit code itself. This information is used to determine the characteristics of the vulnerability. The information will likely include specific criteria that comprise the Signature, such as field values and patterns to match. Research may lead to a long list of characteristics specific to the exploit traffic. It should be borne in mind, however, that Signature based on all suspicious characteristics may be too specific and, hence, may be inefficient or lead to detection problems; whereas a Signature based on only one of the characteristics may be too broad and generate false positives.

Implementation

In embodiments of network 10 for application in process control environments and, more generally, in connection with manufacturing, environmental control, industrial or other operation in which control systems are employed, the following guidelines preferably govern implementation details:

Hardening

In addition to the procedures discussed above, digital data processing devices (e.g., PCs, workstations, mainframes, and so forth) employed within the controls network zone 18, as well as the plant network zone 16 and/or other illustrated zones, are hardened by deactivation of all unnecessary services. This can be accomplished by an iterative process of 1) selectively deactivating an operating system and other services (e.g., ftp, etc.) that is or may not be necessary for normal and/or expected operation;
2) executing a backup (e.g., preferably an incremental backup) to preserve current system status;
3) testing system and/or application execution to determine whether it achieves normal and/or expected operation;
4) if testing reveals that a given deactivation results in unexpected system or application) operation, re-activating the service and repeating steps (1)-(4) with other services;
(5) Once all services that revealed non-essential to normal and/or expected operation are deactivated in accord with steps (1)-(4), the digital data processing device under consideration (and/or the network 10 as a whole) is tested for penetration, e.g., in the manner of a hack, intrusion and/or other mischievous action. If penetration is occurs, steps (1)-(5) are repeated to find additional services for deactivation.

Variations on this methodology include, for example, deactivating and testing groups of services at a time (though, this can lead to confusion as to which services are truly necessary and which are not). Other variations include reversing steps (1) and (2), by way of non-limiting example.

Environmental Considerations

The surrounding environment is taken into account when selecting the media or "wiring method" for network 10 (which media may be "wired," wireless, or otherwise). While unshielded twisted pair is accepted as the wiring method for an office environment, a plant environment introduces conditions which will result in problems. The plant environment may introduce magnetic field interference, radio frequency interference, temperature extremes, vibration, moisture, and dust in the air. The standard RJ-45 connector used on twisted pair wiring and equipment is not water or dust tight and will result in intermittent connections as it is exposed to adverse conditions. Further studies have been done to show that the gold plating on the contacts will degrade when exposed to vibration. An industrial version of this connector is not available and selecting a different connector will not allow the use of readily available network equipment. The cable itself is vulnerable to interference and the jacket material is thin enough that if run in conduit will introduce capacitance and degrade the performance of the network.

Coaxial cable interconnect methods like ThinNet and ThickNet are not preferred for office environments due to the proliferation of unshielded twisted pairs, however are still valid wiring methods in the control environment (and, hence, within at least zones 18 and 20, if not also zones 16 and 14). The shielding of the cable provides for immunity to interference, plenum grade jacket materials are available and the connectors used provide for vibration, dust and moisture immunity.

The use of fiber-optic cable is increasing as the cost has decreased. It is immune to many of the environmental conditions found in the process control environment. The connectors used provide for vibration, dust and moisture immunity and most commercial grade network equipment providers have standard options to support fiber.

Physical Security: In practice, steps are taken to ensure that adequate security measures are taken with respect to implementation of network 10 to restrict unauthorized access to all components utilized in the Control Network (e.g., zones 18, 20), if not also illustrated upstream zones 14, 16. Network equipment is installed in locked areas to prevent tampering. Cable runs are installed in a method to minimize access. Where equipment is installed in locked cabinets, adequate ventilation and air filtration are available.

Protocols: Network 10 is implemented in compliance with one or more of the following protocols and standards: Ethernet; TCP/IP; Device Integrator (allows connectivity between foreign devices at the I/O level); FieldBus (zone 20 and in zone 18, e.g., as necessary to support communications between devices of zones 18 and 20); ProfiBus (zone 20 and in zone 18, e.g., as necessary to support communications between devices of zones 18 and 20); ModBus (zone 20 and in zone 18, e.g., as necessary to support communications between devices of zones 18 and 20); Nodebus (zone 20 and in zone 18, e.g., as necessary to support communications between devices of zones 18 and 20); OPC (Ole for Process Control) (zone 20 and in zone 18, e.g., as necessary to support communications between devices of zones 18 and 20).

Addressing: Network 10 can utilize one or more of the following addressing methods for communications between devices: MAC Addressing; IP Addressing (in the illustrated embodiment, addressing is static and, thus, management of addresses to prevent duplicates is required, though this may not be the case in other embodiments; moreover, addressing is generated by a system definition configurator).

Data Flow Awareness: Network devices are configured to require identity information from zones, and levels; User access levels are defined, e.g., to prevent unauthorized users from accessing more secure areas of the network 10, e.g., zones 18-20.

Firewalls: All external (support) connections are handled in a DMZ; the firewalls, or other network devices, are implemented to log traffic.

Intrusion Detection And Prevention: To facilitate intrusion protection on network 10, the following steps are employed:
  Frequent backups of data are performed, with periodic restorations to insure integrity.
  Host-based protection mechanisms are employed.
  Real-time prevention decisions are implemented, e.g., by IPSs.
  Network devices are configured to protect from attacks at various phases—not just at late stages of attack.
  Network devices are configured to facilitate real time correlation at the agent and enterprise level
  Security mechanisms are implement proactively, not reactively.
  Though IDSs are used (e.g., to signal alerts when the immediacy or obviousness of threat is not readily apparent), a preference is given to IPSs (e.g., elements 68, 70 of FIG. 1) and other devices that provide prevention rather than detection—at least where possible and desirable.
  Routing security audits are performed, e.g., by network management personnel.

Wireless (WiFi) Network Connections: Where wireless access is permitted, the network 10 is implemented along the following lines:
  RF coverage area of the wireless services is surveyed, e.g., to permit placement that will not expose network to unnecessary risk.
  RF interference potentials are taken into account with wireless device placement.
  Decibel signal thresholds are enforce to insure solid connectivity
  Directional antennas are employed, e.g., to insure signal pattern that will not expose network to unnecessary risk.
  Network devices utilize only commercial grade equipment.

Security: To improve security of wireless devices:
  Wireless devices are installed in a separate DMZ on the firewall.
  MAC address filtering is utilized to limit risk of access by unauthorized computers and other equipment.
  Strong data encryption is employed, preferably VPN encryption on the wireless segment
  In implementations where WEP is utilized, use only dynamic or rotating keys are employed.
  SSID broadcasting on the wireless access points is disabled.
  Disable/change SNMP community passwords on all access points
  SSIDs are selected for obscurity.
  Wireless segment are monitored (e.g., automatically or by network personnel) for unknown nodes
  Network performance is monitored and any anomalies immediately investigated.
  Separate, strong administration passwords are maintained on the access points
  Event or syslogging and monitoring is employed
  A central authentication server is employed.
  Where possible, network devices and other attached equipment are powered down during off hours
  Device-independent authentication is used so that lost or stolen devices can't gain access to the WLAN.

Remote Access: In implementations that permit remote access, the following guidelines are followed:
  Strong authentication is employed by modems and other remote access devices (and software).
  Modem access requires require dial back methods and encryption.
  VPN are employed to gain benefit of encryption.

Described above are systems and methods meeting the desired objects, among others. Those skilled in the art will appreciate that the embodiments shown in the drawing and discussed herein are merely examples of the invention and that other embodiments incorporating changes thereto may fall within the scope of the invention. Thus, by way of example, it will be appreciated that, in some embodiments of the invention, the devices of zones 18 and 20 may be combined into a single zone, e.g., comprising PLCs, I/O devices, and other control devices that are coupled to the actuators, sensors, and the like, e.g., that define the system being controlled, and/or form parts (or the whole of) those actuators, sensors, and the like themselves. Likewise, it will be appreciated that the devices that comprise zones 14 and 16 may be combined into a single zone, e.g., that supports business applications and that interfaces with the control network, e.g., via a firewall and IPS/IDS device (or devices), as described above. By way of further example, it will appreciated that IPS/IDS devices can be placed at the interface of each of the network zones and/or at another combination of the interfaces than that shown in FIG. 1.

In view thereof, what we claim is:

1. A digital data network for use with any of a process control system, a computer-based manufacturing/production control system, an environmental control system, and/or an industrial control system (collectively, "control systems"), the digital data network comprising:
    (a) network media that supports communications between digital data devices in first zone and second zones, each zone including one or more of the digital data devices,
    (b) an intrusion system that is coupled to the network media between the first and second zones such that traffic between those zones must traverse the intrusion system,
    (c) the intrusion system blocking traffic on the network media matching one or more signatures specific to a control network ("control signatures") and thereby shutting down a communications connection between the first and second zone.

2. A digital data network for use with any of a process control system, a computer-based manufacturing/production control system, an environmental control system, and/or an industrial control system (collectively, "control systems"), the digital data network comprising:
    (a) network media that supports communications between digital data devices,
    (b) an intrusion system that is coupled to the network media,
    (c) the intrusion system blocking traffic on the network media matching one or more signatures specific to a control network ("control signatures"),
    wherein one or more of the control signatures are indicative of traffic that would change, to an out-of range value, a setpoint for one or more control devices in communications coupling with the network media, and wherein the intrusion system blocks traffic matching those one or more control signatures.

3. The digital data network of claim 2, wherein one or more of the control signatures are indicative of one or more of the following:
    an attempted root login with an incorrect password, via a telnet protocol, to a digital data device in communications coupling with the network media;
    an attempt to login with any of a standard user name and standard password, via any of an FTP and a telnet protocol, to a digital data device in communications coupling with the network media;
    an attempt to login, via execution of a remote executive (rexec) command, to a digital data device in communications coupling with the network media;
    traffic originating from any of an unknown media access control (MAC) address and unknown internet protocol (IP) address; traffic other than from MAC addresses falling within a selected range; and
    wherein the intrusion system blocks traffic matching those one or more control signatures.

4. The digital data network of claim 2, wherein one or more of the control signatures are indicative of an attempt to login, via a telnet protocol, to a digital data device forming part of an I/A Series control system with any of
    a password "gnomes";
    a username "fox" and a password "gnomes"; and
    wherein the intrusion system blocks traffic matching those one or more control signatures.

5. The digital data network of claim 2, wherein one or more of the control signatures are indicative of an attempt to login, via a telnet protocol, to a digital data processor in communications coupling with the network media with any of
    a username "hstorian", wherein that username is a misspelled formative of "historian";
    a username "Administrator" with password "password"; a username "bpm"; a username "pam"; and wherein
    the intrusion system blocks traffic matching those one or more control signatures.

6. The digital data network of claim 2, wherein one or more of the control signatures are indicative of an attempt to access, via any of an ftp and tftp protocol, a password file on a digital data device in communications coupling with the network media, and wherein the intrusion system blocks traffic matching that one or more control signatures.

7. The digital data network of claim 6, wherein one or more of the control signatures are indicative of an attempt to access, via any of the ftp and the tftp protocol, any of the following:
    a password file named "sam" on a digital data device executing a Windows operating system;
    a password file named "passwd" on a digital data device executing a Unix operating system;
    a password file named dmpasswd_cfg on a digital data device comprising a display manager; and wherein
    the intrusion system blocks traffic matching those one or more control signatures.

8. The digital data network of claim 2, wherein the one or more of the control signatures are indicative of packets with a data payload bearing one or more selected commands.

9. The digital data network of claim 8, wherein the one or more of the control signatures are indicative of packets with a data payload bearing any of a "setpars" and "omset" command.

10. A digital data network for use with any of a process control system, a computer-based manufacturing/production control system, an environmental control system, and/or an industrial control system (collectively, "control systems"), the digital data network comprising:
    (a) network media that supports digital data communications,
    (b) an intrusion system that is coupled to the network media and that monitors traffic thereon utilizing signature-based detection in order to identify traffic that is potentially adverse to the control system control or devices therefor in communications coupling with the network media,
    (c) the intrusion system utilizing one or more signatures specific to a control network ("control signatures") and blocking traffic on the network media matching at least a selected control signature,
    (d) wherein the control signatures are indicative of the following:

traffic that would change, to an out-of-range value, a setpoint for one or more control devices in communications coupling with the network media;

an attempted root login with an incorrect password, via a telnet protocol, to a digital data device in communications coupling with the network media;

an attempt to login with any of a standard user name and standard password, via any of an FTP and a telnet protocol, to a digital data device in communications coupling with the network media;

an attempt to login, via execution of a remote executive (rexec) command, to a digital data device in communications coupling with the network media;

traffic originating from any of an unknown media access control (MAC) address and unknown internet protocol (IP) address;

traffic other than from MAC addresses within a selected range;

an attempt to login, via a telnet protocol, to a digital data device forming part of an I/A Series control system with any of
 a password "gnomes";
 a username "fox" and a password "gnomes";

an attempt to login, via a telnet protocol, to a digital data processor in communications coupling with the network media with any of
 a username "hstorian", wherein that username is a misspelled formative of "historian";
 a username "Administrator" with password "password";
 a username "bpm";
 a username "pam";

an attempt to access, via any of an ftp and tftp protocol, a password file on a digital data device in communications coupling with the network media, and wherein the intrusion system blocks traffic matching at least the selected control signature.

11. A method of operating a digital data network for use with any of a process control system, a computer-based manufacturing/production control system, an environmental control system, and/or an industrial control system (collectively, "control systems"), the method comprising:
 (a) transmitting digital data traffic on digital data network media between digital data devices in first and second zones, each zone including one or more digital data devices,
 (b) monitoring that traffic with an intrusion system that is coupled to the network media between the first and second zones such that traffic between those zones must traverse the intrusion system,
 (c) blocking, with the intrusion system, traffic on the network media matching one or more signatures specific to a control network ("control signature") so as to shut down a communications connection between the first and second zones.

12. A method of operating a digital data network for use with any of a process control system, a computer-based manufacturing/production control system, an environmental control system, and/or an industrial control system (collectively, "control systems"), the method comprising:
 (a) transmitting digital data traffic on digital data network,
 (b) monitoring that traffic with an intrusion system that is coupled to the network,
 (c) blocking, with the intrusion system, traffic on the network media matching one or more control signatures specific to a control network ("control signatures"),
 wherein one or of the control signatures are indicative of traffic that would change, to an out-of-range value, a setpoint for one or more control devices in communications coupling with the network media, and wherein the blocking step includes blocking traffic matching those one or more control signatures.

13. The method of claim 12, wherein one or more of the control signatures are indicative of one or more of the following:
 an attempted root login with an incorrect password, via a telnet protocol, to a digital data device in communications coupling with the network media;
 an attempt to login with any of a standard user name and standard password, via
 any of an FTP and a telnet protocol, to a digital data device in communications
 coupling with the network media; an attempt to login, via execution of a remote executive (rexec) command, to a digital data device in communications coupling with the network media;
 traffic originating from any of an unknown media access control (MAC) address and unknown internet protocol (IP) address;
 traffic other than from MAC addresses falling within a selected range; and wherein
 the blocking step includes blocking traffic matching those one or more control signatures.

14. The method of claim 12, wherein one or more of the control signatures are indicative of an attempt to login, via a telnet protocol, to a digital data device forming part of an I/A Series control system with any of
 a password "gnomes";
 a username "fox" and a password "gnomes"; and wherein the blocking step includes blocking traffic matching those one or more control signatures.

15. The method of claim 12, wherein one or more of the control signatures are indicative of an attempt to login, via a telnet protocol, to a digital data processor in communications coupling with the network media with any of
 a username "hstorian", wherein that username is a misspelled formative of "historian";
 a username "Administrator" with password "password";
 a username "bpm";
 a username "pam"; and wherein
 the blocking step includes blocking traffic matching those one or more control signatures.

16. The method of claim 12, wherein one or more of the control signatures are indicative of an attempt to access, via any of an ftp and tftp protocol, a password file on a digital data device in communications coupling with the network media, and wherein the blocking step includes blocking traffic matching those one or more control signatures.

17. The method of claim 16, wherein one or more of the control signatures are indicative of an attempt to access, via any of the ftp and the tftp protocol, any of the following:
 a password file named "sam" on a digital data device executing a Windows operating system;
 a password file named "passwd" on a digital data device executing a Unix operating system;
 a password file named dmpasswd_cfg on a digital data device comprising a display manager; and wherein
 wherein the blocking step includes blocking traffic matching those one or more control signatures.

18. The method of claim 12, wherein the one or more of the control signatures are indicative of packets with a data payload bearing one or more selected commands.

19. The method of claim 18, wherein the one or more of the control signatures are indicative of packets with a data payload bearing any of a "setpars" and "omset" command.

20. A digital data network for use with any of a process control system, a computer-based manufacturing/production control system, an environmental control system, and/or an industrial control system (collectively, "control systems"), the digital data network comprising:
(a) network media that is coupled to control devices to support digital data communications therewith,
(b) an intrusion system that monitors traffic on the network media utilizing signature-based detection in order to identify traffic that is potentially adverse to the control devices or control system,
(c) the intrusion system utilizing one or more signatures specific to a control network ("control signatures") and blocking traffic on the network media matching at least a selected control signature,
(d) wherein the control signatures are indicative of the following:
   traffic that would change, to an out-of-range value, a setpoint for one or more control devices in communications coupling with the network media; an
   attempted root login with an incorrect password, via a telnet protocol, to a digital data device in communications coupling with the network media;
   an attempt to login with any of a standard user name and standard password, via any of
   an FTP and a telnet protocol, to a digital data device in communications coupling with the network media;
   an attempt to login, via execution of a remote executive (rexec) command, to a digital data device in communications coupling with the network media;
   traffic originating from any of an unknown media access control (MAC) address and unknown internet protocol (IP) address;
   traffic other than from MAC addresses within a selected range;
   an attempt to login, via a telnet protocol, to a digital data device forming part of an I/A Series control system with any of
      a password "gnomes";
      a username "fox" and a password "gnomes";
   an attempt to login, via a telnet protocol, to a digital data processor in communications coupling with the network media with any of
      a username "hstorian", wherein that username is a misspelled formative of "historian";
      a username "Administrator" with password "password";
      a username "bpm";
      a username "pam";
   an attempt to access, via any of an ftp and tftp protocol, a password file on a digital data device in communications coupling with the network media, and
   wherein the blocking step includes blocking traffic matching at least the selected control signature.

21. A method of hardening a digital data network for use with any of a process control system, a computer-based manufacturing/production control system, an environmental control system, and/or an industrial control system (collectively, "control systems"), the method comprising:
(a) selectively deactivating any of an operating system service and other service on one or more digital data processors on the digital data network;
(b) backing up the one or more digital data processors to preserve at least current system status;
(c) testing, following deactivation, to determine whether such deactivation affects normal and/or expected operation of any of the control system, the digital data network and the one or more digital data processors;
(d) responding to testing revealing that the deactivation resulted in any of abnormal and unexpected operation by re-activating the deactivated service, and repeating steps (a)-(c) with other services;
(e) following deactivation of services believed non-essential to said normal and/or expected operation, testing any of said digital data network and said one or more digital data processors for any of hacking, intrusion and mischievous action (collectively, "penetration");
(f) responding to testing revealing that such penetration occurs by repeating steps (a)-(d) with additional services.

22. The method of claim 21, wherein the backing up step includes performing an incremental backup.

23. The method of claim 21, wherein the deactivating step includes deactivating a plurality of services.

24. The digital data network of claim 1, wherein the intrusion system provides a failure-mode in which traffic on the network media cannot pass the intrusion protection system in the event of fault of the intrusion protection system ("fail-closed"), thereby shutting down a communications connection between the first and second zones.

25. The digital data network of claim 1, wherein the intrusion system provides a failure-mode in which traffic on the network media cannot pass the intrusion protection system in the event of fault of the intrusion protection system ("fail-closed"), thereby shutting down a communications connection between the first and second zones, and another failure mode in which traffic on the network media can pass the intrusion protection system in the event of fault of the intrusion protection system ("fail-open").

* * * * *

UNITED STATES PATENT AND TRADEMARK OFFICE
CERTIFICATE OF CORRECTION

PATENT NO. : 7,614,083 B2  Page 1 of 1
APPLICATION NO. : 11/078082
DATED : November 3, 2009
INVENTOR(S) : Khuti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Nineteenth Day of October, 2010

David J. Kappos
*Director of the United States Patent and Trademark Office*